June 27, 1933.    W. F. GERICKE    1,915,884
FERTILIZING UNIT FOR GROWING PLANTS IN WATER
Filed July 29, 1930
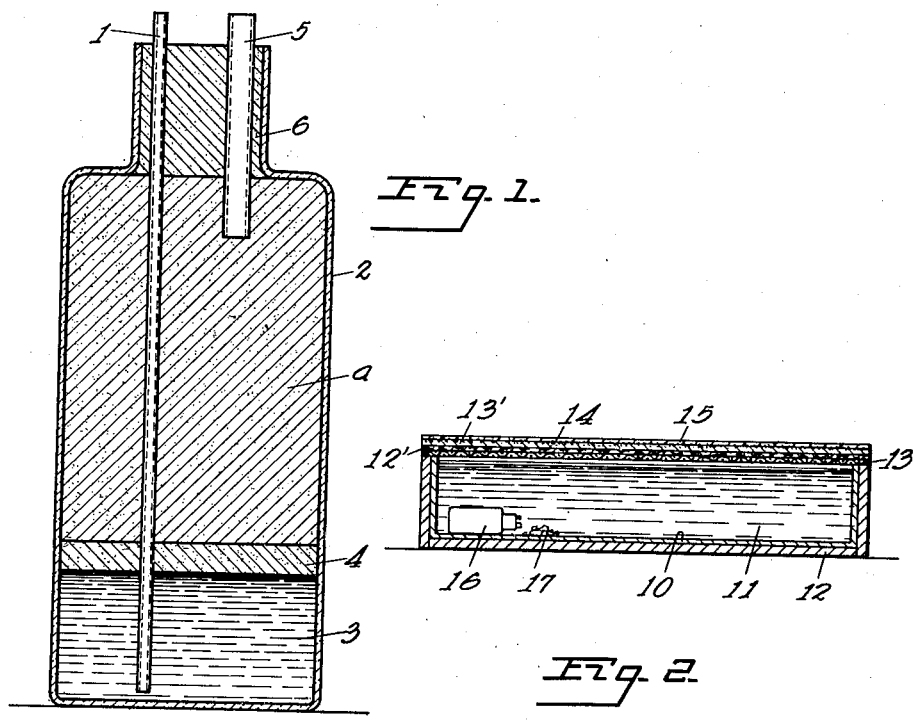
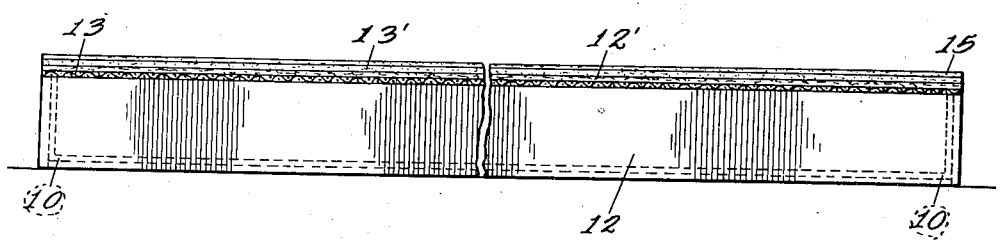
INVENTOR.
WILLIAM F. GERICKE.
BY Munn &Co
ATTORNEYS.

Patented June 27, 1933

1,915,884

UNITED STATES PATENT OFFICE

WILLIAM F. GERICKE, OF BERKELEY, CALIFORNIA

FERTILIZING UNIT FOR GROWING PLANTS IN WATER

Application filed July 29, 1930. Serial No. 471,584.

The purpose of this invention is to enable one without special training in chemistry and plant physiology to grow plants without soil, that is, in water supplied with the essential elements that a fertile soil makes available to the roots of plants. Science has established what these elements are. They are potassium, calcium, magnesium, iron, nitrogen, sulphur, phosphorus, boron, and manganese. The other essential elements are supplied by air and water. Some plants may require traces of other elements in the soil such as copper, zinc, silicon, and chlorine.

All essential elements required by a plant which are of soil origin become available as soluble salts in the soil moisture. It is termed the soil solution. The essential elements are present in the soil solution in various quantities, the magnitude of each being determined by various factors, the discussion of which is not pertinent.

Of the essential elements for growth of plants, some are required in exceedingly small quantities but others are needed in relatively large quantities. A plant's requirement, then, does in a measure define the character of a productive soil solution.

From knowledge of the composition, character, and nature of soil solutions and also that of the compositions and requirements of plants, science has formulated certain principles concerning the nutrition of plants. As early as 1860 science demonstrated that wheat or barley can be grown to full development in water supplied with the elements found in the water extracts of fertile soils. These elements were supplied to the water as soluble salts, and a considerable number of scientific experiments are on record demonstrating the feasibility of growing certain land plants in aqueous culture media.

But the growing of plants in water, supplied with essential elements, has been and is today mere scientific technique and uses equipment confined primarily to scientific laboratories. The technique requires highly trained scientists. The fact that seventy years have elapsed since the first demonstration in a university laboratory of the feasibility of growing a land plant in water which was supplied with the required mineral nutrients, and the subsequent numerous contributions in scientific literature of water cu'ture experiments, or exhibits, all without even consideration of the possibility of developing a practical method of crop production in water, useful and applicable to laymen, is evidence of the failure of those who performed the scientific experiments to understand fully the principles underlying a practical means of crop production in water by laymen.

It cannot be over-emphasized that the purpose of all scientific investigations, employing the water culture method of growing plants, had as the objective the attaining of information of the nutrition, culture, and production of plants as applied to soil.

To contrast the chief features of the invention herein to be described and the method employed by science of growing a few plants in water, it may be well to describe briefly how water culture experiments are conducted in scientific laboratories. The elements for plant growth in water being known, solutions of chemically pure salts are prepared, then definite quantities of each solution are added to a glass container filled with distilled water. The quantities of each salt added are those of some formula which had been found to work. By trial it had been found that certain combinations of salts produce better culture media than others. Furthermore, distilled water, rain water, or very pure spring water was always required in these scientific experiments, because the reaction of the nutrient solutions due to the adding of the salts would vary according to the purity of water used. Thus a certain formula giving the amount of various salts to be used if added to distilled water would prove a good medium for plant growth, but if added to the same quantity of ordinary tap water would produce a harmful condition for plant growth.

To overcome the harmful effect of excretion due to plant growth in water, the solutions were usually discarded after a few days' or weeks' use and new solutions supplied or some device providing a continual flow of nutrient solution provided. Iron, a necessary constituent in nutrient solutions, was always added at intervals of a few days as this element reacted very readily with other elements, chiefly phosphorus, forming an insoluble, hence inavailable compound, thus necessitating frequent applications of this element.

Small glass or earthenware containers holding a few hundred cubic centimeters up to a liter capacity were used. Growing plants in water was therefore scientific research only. It was not conceived to have any practical application as a means of crop production either in the hands of a scientist or layman.

The production of plants in water by laymen was precluded by lack of knowledge, and by conveniences and other means available to the scientist. If a product could be obtained which would meet or supply the requirements of growth of plants in water without the necessity of the laborious and specialized features of the method as employed in scientific laboratories, laymen could grow plants in water. The invention herein to be described is such a product. It is a complete fertilizing unit that supplies to and maintains when added to a specified quantity of any ordinary potable water the required conditions and properties requisite for the growth of plants.

The chief properties of a complete fertilizing unit for the production of plants in water by laymen are the following:

(a) The product must contain all of the essential elements a fertile soil makes available to plants.

(b) The product must release the various elements and make them available in such quantities as the plants require.

(c) The product must release the various elements in proper proportion one to another as they are required by plants.

(d) The product must impart to and maintain the proper reaction in the aqueous culture medium in which the plants are rooted.

(e) The product must release substances that will counteract the harmful effects of plant excretions which are incident to growth.

(f) The product must be, compounded to preclude chemical reactions from taking place between ions that will render them insoluble and hence inavailable in the culture media in which the plants are rooted.

(g) The product must be of a nature that persons with ordinary intelligence can use successfully.

(h) The product should be such as to eliminate the specialized features such as the complete change and renewal of nutrients in order to remove toxic excretions of plant growth; the necessity of adding iron or any other element at frequent intervals; the need of water of special purity; the need of chemicals of special purity; and other features which have given or may give the method the stamp of restricted application.

Other objects and advantages will appear as the specification proceeds, and the novel features of the device will be particularly pointed out in the claims hereto annexed.

My invention is illustrated in the accompanying drawing forming a part of this application, in which:

Figure 1 is a vertical section through the device,

Figure 2 is a section through one of the troughs showing my device in use, and

Figure 3 is a side elevation of the trough.

In carrying out my invention I make use of certain elements which are conducive to plant growth.

(a) Weigh out the following quantities of salts.

| | Grams |
|---|---|
| Potassium nitrate | 5,050 |
| Magnesium phosphate | 600 |
| Calcium sulphate | 770 |
| Ferric sulphate | 100 |
| Manganese sulphate | 20 |
| Sodium borate | 20 |

Pulverize the last three salts very thoroughly and mix all six salts together. Any lumps that may exist must be reduced to small fragments in order to obtain uniform composition of samples.

Any multiple of the above quantity can be prepared at a time.

(b) Measure the following quantities of concentrated sulphuric acid, sp. G. 1.82 into glass bottles, test tubes, or any suitable containers for various sized units desired.

| $H_2SO_4$ | Size of bottles |
|---|---|
| c.c. | c.c. |
| 90 | 500 |
| 45 | 250 |
| 25 | 125 |
| 10 | 50 |
| 5 | 25 |
| 3 | 15 |

Place a glass tube or conduit 1 of approximately 4 mm. diameter into a bottle 2 of 250 cc. capacity or larger, one end of the tube resting on the bottom of the bottle in the acid 3, the other end extending approximately one-fourth inch above the mouth of the bottle. It is best to use 2 mm. tubes for the two smallest units and 3 mm. for the intermediate sizes.

Pour melted paraffin into the bottle to form a layer 4 on the acid about three-eights of an inch in thickness. Allow the paraffin to solidify. After solidification of the paraffin, fill the bottle to within three-fourths inch from where the neck begins with the salt mixture (a).

Then insert a glass tube or conduit 5 of 8 mm. diameter making contact with the salt. Tamp and fill with the salt mixture to the neck. Cover the salt and fill flush with melted paraffin 6, thus sealing the tubes and the salt in the bottle. When the paraffin 6 has solidified, the unit is ready for use. Use 4 mm. tubes 5 for the smallest units and 6 mm. tubes for the intermediate sizes.

Potassium nitrate, magnesium phosphate, and calcium sulphate are used as the salts to supply the units with K, N, Mg, P, Ca, and S, in order to have a 1 to 1 ratio of chemically equivalent quantities of K to N, of Mg to P, and of Ca to S. It is to be noted that the quantities of the first three salts named in (a), when each is divided by the molecular weight of the salt, make the molecular ratio of the salts respectively 10–1–1, i. e. there are 10 molecules of potassium nitrate to each molecule of magnesium phosphate or calcium sulphate. This ratio has been found to give very satisfactory results. It is, however, not contended that this salt proportion must be rigidly adhered to in the manufacture of the complete fertilizing unit, or even is it contended that these salts are the only ones that can be used. Complete fertilizing units can be made from other combinations involving the use of such salts as calcium nitrate, magnesium nitrate, primary and secondary calcium phosphate, magnesium phosphate, potassium phosphate primary and secondary, magnesium sulphate and the like in which both the cations and the anions are nutritive in nature. Also, certain salts in which only one of the ions is of nutritive nature may be used in certain cases.

The 1 to 1 ionic ratio of K to N, Mg to P, and Ca to S, and the molecular ratio of 10 to 1 for the potassium salt to that of magnesium salt and also calcium salt can be obtained by substituting the chemical equivalents of $CaHPO_4$ for $MgHPO_4$ and $MgSO_4$ for $CaSO_4$ as given in the formula.

The buffer properties and the reactions of nutrient solutions vary with the salt combinations used. The less soluble the salt and the greater the proportion of monovalent ions to those of divalent and trivalent values, the easier a given required reaction in a nutrient solution can be maintained. All salts must become completely soluble in water to be available to plants, but the greater the total concentration of a nutrient solution the greater the buffer property of such media. The combination of salts specified in the complete fertilizing unit was chosen to obtain ideal conditions relative to buffer property, reaction, concentration of various ions, total concentration, and ratio of element to element.

The mechanism by which the essential elements are delivered into the reservoir in which the plants are growing or are to be grown is that of the exceptionally great power of sulphuric acid to attract water whereby the volume of the contents of the fertilizing unit is increased, causing the same to flow and diffuse into the water in which plants are rooted. The property of sulphuric acid provides means for drawing water into the bottle and into contact with the plant food, whereby the internal pressure within the bottle is increased, and the plant food is gradually and slowly discharged through the outlet into the water, thus producing a means for effecting a regulated simultaneous discharge of the salt and the acid over an extended period of time. Other chemicals than sulphuric acid attract water and could be used so far as it involves this one process only.

Any water-attracting chemical or device which would impart harmful properties to the culture media obviously would defeat the purpose of this invention. The quantity of sulphuric acid contained in each fertilizing unit if added in the free state to the quantity of water prescribed for the use of a fertilizing unit would render the medium far too acid for any kind of plant to grow.

In operation, sulphuric acid produces a large amount of heat upon contact with water. A hole is melted in the layer 4 of paraffin (i. e. around the glass tube 1 inserted therein) when the unit is submerged in water and the acid 3 comes in contact with the salts. The chemical reactions and the resulting products must be such that they will not be harmful to the plants. Indeed, the aggregate results of all reactions must be beneficial to plants. The quantity of acid used, the kind of salts used, the various quantities of each salt used are determined by the aggregate effect the reaction of water-attracting chemical will have first on the salts and secondly on the culture media.

The reaction of aqueous culture media needs to be slightly acid for most plants. The optimum reaction varies with plant species. For best growth in water of many of the important plants a reaction stated as Ph 5 to Ph 7 is optimum. Other acids than sulphuric could be used to obtain a desired reaction in culture media, but as no other acid contains singly so many of the desired properties, as strong water-attracting properties, high coefficient of dissociation, no harmful end products of reaction, and being relatively inexpensive, it is obviously the desired reagent to use in the fertilizing units.

The property of the fertilizing unit to deliver continuously for a long time small quantities of acid into the reservoir of water-growing plants, makes it possible to maintain a desired acid reaction to the culture medium.

The property of sulphuric acid to react with and neutralize toxic and growth inhibiting plant excretions prevents the culture medium from becoming foul, and this explains how the necessity of frequent renewal of culture media previously referred to is eliminated.

The continual delivery from the fertilizing unit of acidulated salts allows the use of any ordinary drinking water, because the mixing of small quantities of relatively strongly aciduated salt solutions with relatively large quantities of neutral or slightly alkaline water produces a condition that allows sufficient absorption of nutrients by plants. (Experimental evidence has shown that one cause of failure of plants to grow in neutral or slightly alkaline water is that this condition precludes absorption of certain elements.)

The continual delivery from the fertilizing unit of small quantities of acidulated iron salt keeps this essential element in available form and precludes the necessity of frequent applications of an iron salt—a feature hitherto common to all water culture experiments on record.

The reaction of a culture solution can be altered by three methods: (a) Variation of the amount of acid, (b) Variation of the proportions of salts given in the formula, (c) Use of different groups of salts. Any desired reaction can be obtained by proper use of any one of these methods.

In order to obtain the proper conditions for growth in water for a few plants unique in food requirements, it has been found advisable to introduce some of the salts singly in layers, instead of first mixing them all together, as the purpose of stratification is to place those elements which would be used in the earliest growth period of the plant at the top of the fertilizing unit and those later in the bottom next to the layer of paraffin. Also, separation of the iron salt from the phosphate salt is advisable in certain cases, as the absorption of sufficient iron during the early growth period of some plants is markedly facilitated by delaying the introduction of phosphorus into the culture medium.

In certain rare cases it may be advisable to incorporate antiseptics in the fertilizing unit, using such quantities of a suitable antiseptic as the prescription for the use of the given antiseptic provided.

From the foregoing description of the various parts of the device, the operation thereof may be readily understood.

The fact that many different plant species thrive in the same soil, as well as the fact that many plant species thrive in very diverse soils, is suggestive that one kind of fertilizing unit may be suitable for quite a number of different kinds of plants. This is true. But plants vary as to the type of cultivation required for the best growth. This is particularly true of plants grown in water. Due to this feature, it is not possible to give general directions for the production of plants in water that would apply to each species. Specific directions must be provided for each species or plant that may require different treatment to be available with the proper fertilizing unit.

One method for growing plants in water on a rather large scale is as follows:

A strip of bituminous paper 10 such as is commonly used for roofing is laid on the level ground, either in the open field or under glass, as the case may require. Portions of each end and side are turned upward. This makes a large, open, flat tank 11. Each reservoir or tank 11 is held in place by a wooden frame 12 built around it. Poultry netting wire 13 with two-inch or larger mesh is stretched over the reservoir 11. The netting is covered with loosely woven burlap 12', excelsior, or straw, and a thin layer of soil 13', sand, or sawdust about one-half inch thick is placed thereon. This is the seed bed.

Seeds 14 are sown on this bed, and covered with a very thin layer of soil or sawdust 15. The reservoir is filled with water. Fertilizing units 16 of sufficient capacity for the tank are placed in each reservoir. A small amount of ground limestone 17 is placed with each unit as a precautionary measure, for an infrequent though a possible excessive outward diffusion of acid. I have found that one 500 cc. fertilizing unit which contains approximately one pound of nutritive salts, added to 10 or 12 cubic feet of water produces the proper condition in the water for the growth of plants. The smaller units are for proportionally smaller quantities of water. Units suitable for growth of single plants in two-quart or one gallon glass jars can be prepared.

Reservoirs of various construction and composition can be used. Clay soil can be treated with chemicals and the material worked into suitable reservoirs impervious to water. Seed beds can be constructed to combine the various materials used into one article and eliminate the need of separate articles such as poultry netting, burlap, sawdust, etc.

The seeds sprout and send their roots down into the water where the roots are further nourished throughout the plant life.

I claim:

1. A fertilizing unit for growing plants in water comprising a container, water soluble plant food disposed therein, a water absorbing means disposed in the container, a conduit leading from the means to the exterior of the container, a second conduit leading from the plant food to the exterior of the container, and means for holding the plant food and water absorbing means against removal except through the conduits, said last named means holding the conduits in position.

2. A fertilizing unit for water comprising a container, plant food disposed in said container and being soluble in water, sulphuric acid disposed in said container for attracting water into the container for gradually dissolving the plant food, and means for diffusing the soluble plant food into the water.

3. A fertilizing unit for water comprising a bottle, plant food disposed in said bottle and increasing in bulk when mixed with water, an outlet for the dissolved plant food, and means for gradually sucking water into the plant food for causing a gradual delivery of the food into the water due to the food increasing in bulk.

4. A fertilizing unit for water comprising a container, sulphuric acid disposed therein, plant food disposed therein, a layer of material separating the acid from the plant food, said layer being melted by the heat generated from the combining of the acid with water, and means for conveying water to the acid.

5. A fertilizing unit comprising a container, sulphuric acid and water soluble salts disposed in said container, a layer of paraffin separating the acid from the salts, means for conducting water to the acid, whereby the heat generated will melt a hole in the paraffin and give the water access to the salts, and an outlet for the soluble salts.

6. A fertilizing unit comprising a container having water soluble salts and sulphuric acid separately confined therein.

7. A fertilizing unit for growing plants comprising a bottle having a restricted outlet, water soluble plant food within the bottle and means for drawing water into the bottle and into contact with the plant food whereby the latter is gradually discharged through the outlet.

8. A fertilizing unit for growing plants comprising a bottle having a restricted outlet, water soluble plant food within the bottle and means for increasing the pressure within the bottle whereby the plant food is slowly discharged through the outlet, and means for maintaining the latter means inactive until the unit is immersed in water.

9. A fertilizing unit for growing plants comprising a bottle having a restricted outlet, water soluble plant food within the bottle and means becoming active upon immersion of the unit in water for slowly urging the plant food through said outlet.

10. A fertilizing unit for the production of plants in water comprising a salt mixture and a separate body of sulfuric acid and means for effecting a regulated simultaneous discharge of the salts and the acid over an extended period of time.

11. A fertilizing unit comprising a body of water soluble salts, an enclosure for the same having an outlet and means for generating internal pressure within the body whereby the salts are slowly discharged through the outlet.

12. A fertilizing unit comprising a body of water soluble salts, an enclosure for the same having an outlet and means for generating internal pressure within the body whereby the salts are slowly discharged through the outlet, the said means also serving to acidulate the plant food.

13. A fertilizing unit for growing plants comprising a bottle having a restricted outlet, water soluble plant food within the bottle and means for slowly urging the plant food through said outlet including means for rendering the plant food antiseptic.

14. A fertilizing unit for the production of plants in water in which the acid required to obtain and maintain a reaction to the culture medium of Ph 5 to Ph 7 is kept separate from the plant food and in an inactive state when the unit is not in use.

WILLIAM F. GERICKE.